United States Patent
Renwick et al.

(10) Patent No.: US 7,151,775 B1
(45) Date of Patent: Dec. 19, 2006

(54) APPARATUS AND METHOD FOR FORWARDING DATA ON MULTIPLE LABEL-SWITCHED DATA PATHS

(75) Inventors: John K. Renwick, Minneapolis, MN (US); Ross W. Callon, Westford, MA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 09/405,237

(22) Filed: Sep. 23, 1999

(51) Int. Cl.
*H04L 12/28* (2006.01)
*H04L 12/56* (2006.01)

(52) U.S. Cl. .................. 370/400; 370/392; 370/409

(58) Field of Classification Search ............... 370/400, 370/389, 401, 409; 711/216, 211, 212, 214
See application file for complete search history.

(56) References Cited

U.S. PATENT DOCUMENTS

| | | | | |
|---|---|---|---|---|
| 5,414,704 | A * | 5/1995 | Spinney ..................... | 370/389 |
| 5,473,607 | A * | 12/1995 | Hausman et al. ........... | 370/392 |
| 6,081,511 | A * | 6/2000 | Carr et al. .................. | 370/228 |
| 6,173,384 | B1 * | 1/2001 | Weaver ...................... | 711/216 |
| 6,275,492 | B1 * | 8/2001 | Zhang ........................ | 370/392 |
| 6,339,595 | B1 * | 1/2002 | Rekhter et al. ............. | 370/392 |
| 6,341,127 | B1 * | 1/2002 | Katsube et al. ............. | 370/230 |
| 6,359,886 | B1 * | 3/2002 | Ujihara et al. .............. | 370/392 |
| 6,374,303 | B1 * | 4/2002 | Armitage et al. ........... | 370/390 |
| 6,697,329 | B1 * | 2/2004 | McAllister et al. ......... | 370/235 |
| 6,721,269 | B1 * | 4/2004 | Cao et al. ................... | 370/227 |
| 2002/0110119 | A1 * | 8/2002 | Fredette et al. ............. | 370/389 |

FOREIGN PATENT DOCUMENTS

WO    WO98/07259    2/1998

OTHER PUBLICATIONS

Farinacci et al., "Tag Switching Architecture Overview", Dec. 1997, IEEE, vol. 85, No. 12, pp. 1973-1983.*
Yakov Rekhter, Bruce Davie, Dave Katz, Eric Rosen and George Swallow, "Tag Switching Architecture", 1996, Cisco Systems.*
Bruce Davie, Tony Li, Eric Rosen, and Yakov Rekhter, "Explicit Route Support in MPLS", Nov. 1997, Networking Working Group Internet Draft.*
Semeria, Chuck, "Multiprotocol Label Switching Enhancing Routing in the New Public Network", Mar. 17, 1999, Juniper Networks, Inc.*
Woodcock, JoAnne, "Microsoft Press Computer Dictionary, Second Edition", 1994, Microsoft Press, p. 193.*

* cited by examiner

*Primary Examiner*—Chi Pham
*Assistant Examiner*—Justin M Philpott
(74) *Attorney, Agent, or Firm*—Donald R. Boys; Central Coast Patent Agency, Inc.

(57) ABSTRACT

An apparatus and method for forwarding data on a network are described. A label-switching subnetwork within the network includes an ingress node and an egress node coupled to source and destination nodes, respectively, on the network. The ingress node sends a signal along a route within the subnetwork through a plurality of subnetwork nodes to the egress node. In response, the subnetwork nodes transmit response signals back along the route toward the ingress node which define the route through the subnetwork and simultaneously allocate a plurality of paths within the route. A single path can be selected for forwarding of data packets associated with a source/destination pair, ensuring that data packets arriving at the destination are not misaligned.

3 Claims, 3 Drawing Sheets

APPARATUS AND METHOD FOR FORWARDING DATA ON MULTIPLE LABEL-SWITCHED DATA PATHS

BACKGROUND OF THE INVENTION

In digital computer networks such as the Internet, collections of data, referred to as "datagrams," are typically transferred from node to node over the network in packets. Each packet of data typically includes a header portion and a data portion. In accordance with the common Internet protocol (IP), the header portion typically includes a 32-bit source identifying portion which identifies the source node that originated the packet and a 32-bit destination identifying portion which identifies the destination node to which the packet is ultimately to be transferred.

At each node, a router is used to forward the packet to the next node in the path toward the destination node. When a router receives a packet, it examines the destination address in the packet header. It then searches its locally stored routing table to determine the next node to which the packet should be transferred in order to ensure that it will reach its destination, typically along the shortest possible path. The router then forwards the packet to the next node identified in the routing table. This process continues at each successive node until the destination node is reached.

Another technique used to forward packets which can be implemented in IP routers is referred to as multiprotocol label switching (MPLS), or simply label switching. In MPLS, a path or route, referred to as a label-switched path (LSP), through a label-switched network or subnetwork is created before actual data traffic is forwarded over the network. The LSP directs the forwarding of datagrams from a given ingress point to a given egress point in the bounded network or subnetwork.

In general, any pair of network nodes may be directly connected by more than one physical link. These physical links are equivalent to each other in the sense that a packet may be sent over any of them without affecting the way it is delivered to the ultimate destination. A set of such links comprises a single "logical link." This configuration is referred to herein as "multiple parallel links." In traditional IP forwarding, data traffic for a particular source and destination, i.e., a "flow," should always travel along the same link to ensure that data packets are not misaligned in time when they arrive at the destination node. Therefore, a router must select one of multiple links for transmission of data packets to the next link, and, for each source/destination pair, it must select the same link to ensure proper alignment of data at the destination. The router typically performs an analysis of the packet header contents to assign each packet to a physical link. Usually this involves a hash function of the 5-tuple of fields in the IP header (source IP address, destination IP address, protocol, source port number, destination port number) or a subset of these fields, such as source IP address and destination IP address. A hash function is designed to perform a computation on one or more data words and return a unique data word of shorter length. For example, a hash function performed on two 32-bit IP addresses may divide the combined 64-bit word by a constant and return as a result the value of the remainder in fewer bits, e.g., five. Other hash procedures include the use of a cyclic redundancy check (CRC) and the use of a checksum. Each time a hash procedure is performed on the same initial values, the same result is obtained. Therefore, deriving the link assignment from such a hash ensures that all packets with the same field contents take the same physical link, and thus all packets of a given application flow also take the same link. This ensures that the existence of multiple links does not contribute to the risk of misordered packets within a flow.

In MPLS packet forwarding, MPLS can be used to route some traffic over a path other than the shortest one in order to relieve congestion on some paths. In a label switching network, paths are set up in advance for given sets of traffic that are to be forwarded along the same path. A set of traffic that is to follow the same paths is commonly referred to as a forwarding equivalence class (FEC). The ingress router can create label-switched paths (LSPs) to each of the other edge routers to which it expects to send traffic, and it can make all the decisions about the routes taken by the packets it forwards. It can do so by asking each downstream router in the path to assign a label value to the path. Using a signaling protocol such as RSVP or LDP, the ingress node sends a path setup request signal along the desired path to request labels from each of the nodes in the path. When the signal reaches the egress node, the egress node begins the process of allocating labels for the path. The egress node sends its allocated label back to the next preceding node, which stores the label and generates its own label for the traffic and transmits that label back to its next preceding node. This continues until all of the nodes along the path have assigned labels for the given FEC traffic.

When the ingress router desires to send a packet along a path, it places a small header, referred to as the MPLS header, on the front of the packet. The MPLS header contains the label value assigned by the next router in the path. The router then forwards the packet with the new MPLS header to the next router, which removes the label from the packet and replaces it with the label assigned by the next router. The packet is then forwarded to the next router. This continues until the packet has been forwarded over the entire LSP, i.e., it reaches the egress router. The egress router knows that it is at the end of the LSP, so it removes the MPLS header from the packet and forwards the packet on the network using the traditional IP destination address lookup.

In MPLS, the labels assigned by the nodes identify the route to be taken from node to node along the LSP, but they do not readily provide the ability to distinguish multiple physical parallel links within the route or path. One reason for this is that it is difficult to compute an IP address hash at each node or "hop," as is done in IP forwarding, because the IP header is "hidden" behind the MPLS header. Hence, the hash procedure, which may be usable to select one of many paths, is not readily adaptable to MPLS. One of the features of MPLS is that the LSP carries opaque traffic, that is, the end points of the LSP know what protocol is carried, but the interior nodes do not. This feature could allow MPLS to be used to create virtual private networks that carry other protocols as well as IP. This means that an interior node cannot reliably compute an address hash, because it does not know anything about the contents of the packet behind the first MPLS header. Furthermore, even if it is known that all packets carry IP datagrams, there is a problem knowing where the IP header is located within the packet. This is because MPLS permits a stack of label headers to be added to the front of a packet. The label header format includes a single bit indicating the last label before the encapsulated protocol begins, meaning that the position of the encapsulated header must be found by examining the label headers, one-by-one, until the last one is found.

Conventional MPLS suffers a drawback in that, with conventional MPLS, it is relatively inefficient to set up multiple parallel paths to distribute traffic over multiple parallel physical links. In particular, each individual path needs to be independently signaled, i.e., set up. This signaling becomes particularly inefficient when there are a large number of potential parallel paths.

SUMMARY OF THE INVENTION

The present invention solves the above problems and drawbacks of the prior art by providing a technique for allocating multiple paths in a route that is defined from node to node in a label switching network and a technique for distributing traffic of an FEC over multiple paths while ensuring that traffic of individual flows is not sent over different paths. The invention is directed to an apparatus and method for forwarding data from a source to a destination over a network which includes a subnetwork within the network, which in one embodiment is a label-switching subnetwork. The subnetwork includes a plurality of subnetwork nodes connected by a plurality of subnetwork links. The subnetwork nodes include an ingress node and an egress node coupled to the source and destination, respectively. At least one pair of subnetwork nodes is connected by a plurality of subnetwork links, i.e., parallel physical links. The subnetwork nodes and links define a plurality of subnetwork paths between the ingress node and the egress node. A response request signal is forwarded from the ingress node to the egress node along a route through a subset of subnetwork nodes between the ingress node and the egress node. The response request signal requests a response from each node along the route. The response signals sent by the nodes define or allocate a plurality of paths within the route between the ingress node and the egress node.

In general, the subnetwork is a label-switching network within a larger network such as the Internet which forwards data using the Internet protocol (IP). The ingress node can be coupled to and receive packets from multiple source nodes and/or nodes interposed between the source nodes and the ingress node. Likewise, the egress node can be coupled to and transmit packets to multiple destination nodes and/or nodes interposed between the egress node and the destination nodes. In general, packets can be forwarded to the ingress node of the subnetwork using IP packet forwarding. The ingress node router can attach an MPLS header to the packet and forward it along the subnetwork using label switching in accordance with the invention to the egress node router. The egress node router then removes the MPLS header from the packet and forwards the packet to the next node on the way to the destination node using IP forwarding.

The data for each source/destination pair will be assigned a single path within the route. As a result, misalignment of data at the egress node is avoided.

In one embodiment, the response signals sent by the nodes simultaneously define the multiple paths in accordance with the invention. The response signal can include a label word which defines a number of data bits for the label. A certain predefined portion of the bits of the label word define the route to be used such that packets are forwarded along the correct path from node to node. The remaining bits are used to define multiple paths within the route allocated by the nodes to carry data. For example, in one embodiment, a complete label word is twenty bits long. To establish 32 paths, for example, the first fifteen bits of the response label word can be used by a node to identify the route. The remaining five bits can be used to select one of 32 possible paths within the route. Hence, in the response label word transmitted by a node, the first subset or group of bits, e.g., fifteen bits, identifies the route. The remaining, e.g., five, bits are "don't cares."

The ingress router can select one of the available allocated paths based on the source and destination of an arriving packet. For example, the ingress router can perform a hash operation on the IP source and destination fields in the IP header of the packet to produce a unique word of the same number of bits as the number of "don't care" bits in the response label. The resulting word can then be used to select one of the paths. In the example above, where five bits are used to select one of 32 paths, a hash operation can be performed on the 32-bit source and destination IP addresses to produce a unique five-bit word, which is then used to select one of the 32 possible allocated paths.

In actuality, each node router need not actually transmit the don't care bits back up the route to the ingress router. Only the bits used to identify the route need be transferred. The ingress router can perform the necessary operations for selecting one of the allocated paths. Since the system provides for selection of a single path for a given source/destination pair via the hashing procedure, it is ensured that misalignment of data at the egress node is avoided.

The approach of the invention provides numerous advantages. For example, label switching, which is much faster and more efficient than IP forwarding, can be used efficiently in an environment with multiple parallel links. The system allows multiple paths to be set up simultaneously instead of requiring that each path be set up individually. This saves considerable processing time, which leads to improved network operation, particularly with respect to reduced time to set up or adjust paths. This also allows a bundled set of paths to be handled with reduced control resources, when compared to the resources required to set up paths individually.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
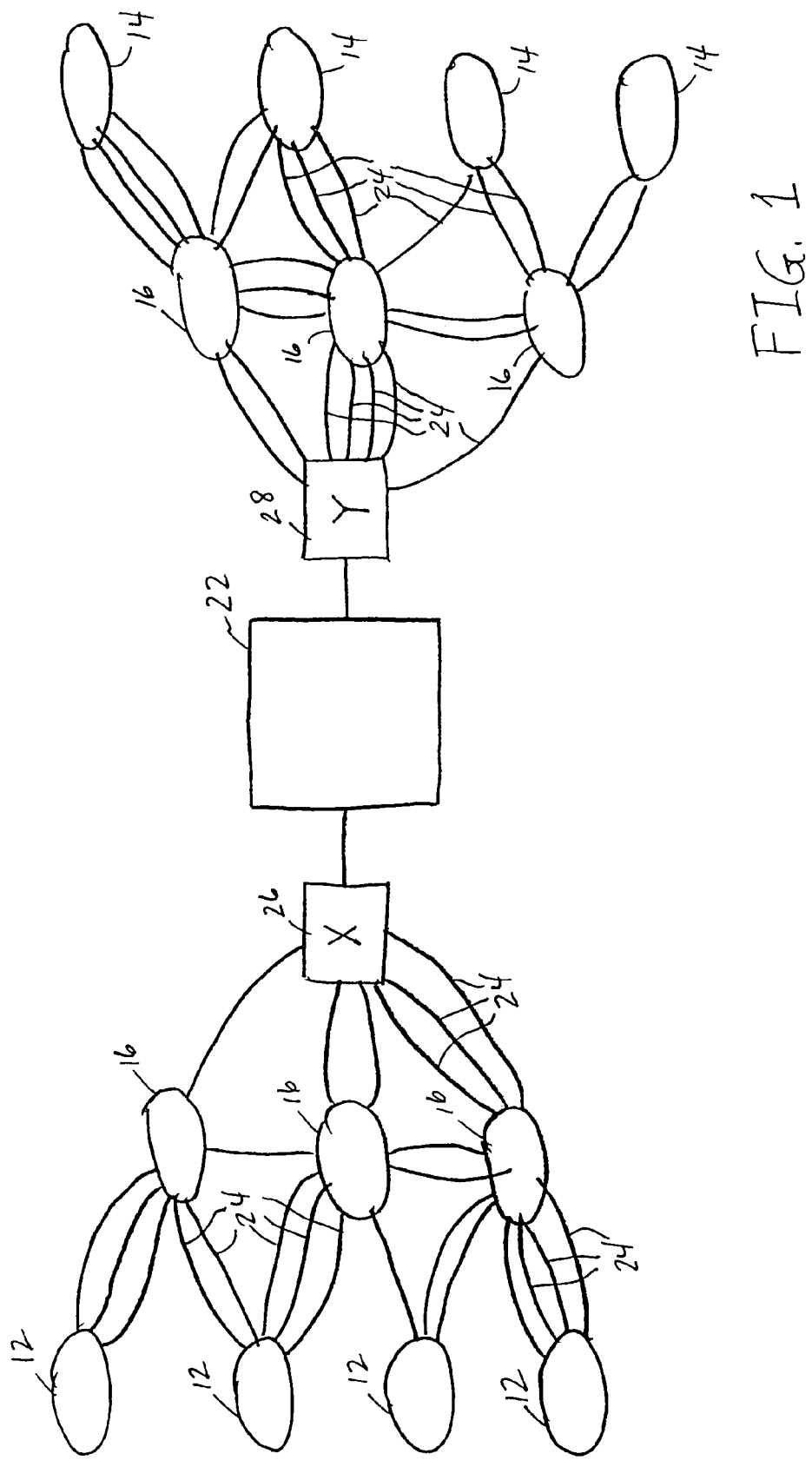
FIG. 1 is a schematic block diagram of a network 10 which can implement a packet forwarding technique in accordance with one embodiment of the invention.

FIG. 1 is a schematic block diagram of a network 10 which can implement a packet forwarding technique in accordance with one embodiment of the invention. Referring to FIG. 1, the network 10 can include multiple nodes 16 connected by links 24 which carry data packets from node to node on the network 10. As shown, the network includes multiple source nodes 12 and destination nodes 14 connected to the network nodes 16. A source node 12 can forward data packets over the network 10 to a destination node 14. It will be understood that the source and destination nomenclature is used as a convention to describe the direction of data flow. In conventional networks, all nodes can typically serve as a source node or a destination node, depending upon whether it is sending or receiving data.

In accordance with the invention, the network 10 includes a subnetwork 22 over which packets can be transferred en route from a source node 12 to a destination node 14. Packets enter the subnetwork 22 through a node X(26) and exit the subnetwork 22 through a node Y(28). In accordance with the invention, the network 10 is primarily an IP network which transfers packets between the nodes 16 using the common IP packet forwarding protocol. Each node includes a router with a stored routing table which allows the router to determine the node to which a packet should be forwarded based on a table lookup of the destination address stored in the IP header of the packet. In accordance with the invention, the subnetwork 22 does not forward data packets using the IP protocol. It is an MPLS label switching network which forwards packets using label switching. Node X forwards packets into the subnetwork 22 using IP forwarding protocol. The packets are forwarded through the subnetwork 22 as described below in detail using a label switching technique in accordance with the invention and are transferred out of the subnetwork 22 to node Y using IP packet forwarding. From there, the packets continue on to their designated destination nodes 14 using IP forwarding.

Figure 2:
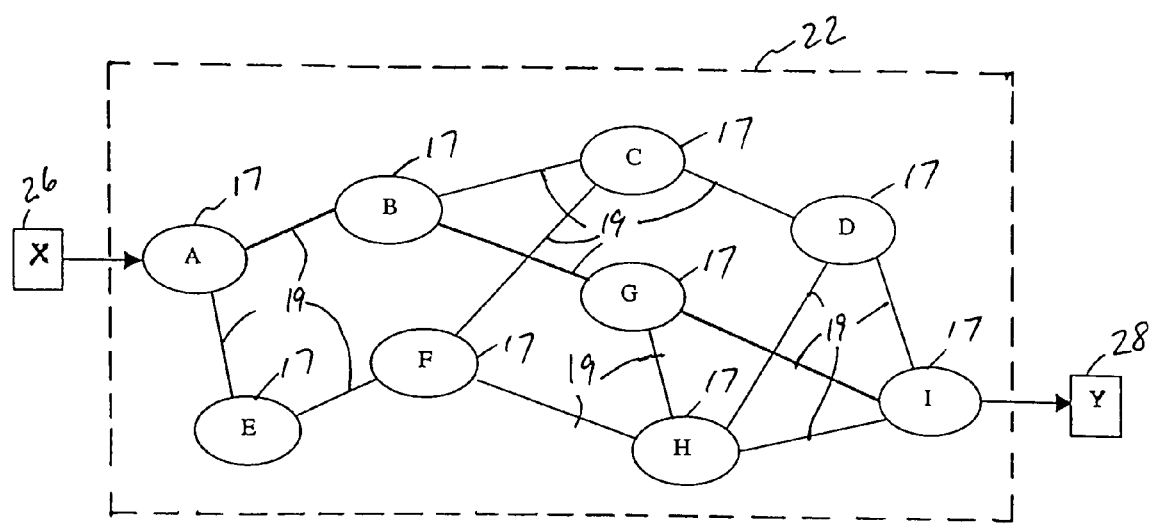
FIG. 2 contains a detailed block diagram of the subnetwork shown in FIG.

FIG. 2 contains a detailed block diagram of the subnetwork 22 shown in FIG. 1. The subnetwork 22 includes multiple nodes 17 connected by links 19. A datagram or packet from node X(26) to node Y(28) enters the subnetwork 22 at ingress node router A and exits through egress node router I. In traditional IP forwarding, each router in the network would independently compute the shortest paths for packets to all known destinations, and each router would forward each packet by looking up its destination address in a forwarding or routing table. For a packet from X to Y, the shortest path would be A-B-G-I.

Thus, traditional node-by-node or hop-by-hop IP routing would try to make every packet take the shortest path from entry to exit in the subnetwork. This is efficient, but it might leave some network resources relatively underutilized, while causing some other resources to become overloaded. In FIG. 2, the path A-B-C-D-I is an alternative path for packets from X to Y that, while longer than the path selected by hop-by-hop routing, could still be used to carry some of the load. This might help to relieve congestion on the path B-G-I.

MPLS can be used to route some of the traffic over a path other than the shortest one. In order to increase the degree of control of network path utilization, MPLS paths can be managed from a single point rather than hop-by-hop. For instance, the ingress router A can create label-switched paths (LSPs) to each of the other edge routers to which it expects to send traffic, and it can make all the decisions about the routes taken by the packets it forwards.

An ingress router A creates a label-switched path by asking each downstream router in the path to assign a label value to the path. In one implementation, a label is an integer value small enough to be used as an index value in a table lookup. As an example, it is assumed that ingress router A wishes to send set up a label-switched path A-B-C-D-I. Using a signaling protocol, such as RSVP or LDP, it sends a path setup request along that path. The routers in the path assign, for example, the following label values to it: B assigns 4, C assigns 20, D assigns 38, and I assigns 9. It should be noted that these label values are selected for purposes of illustrating an example of the invention. In practice, the values selected by the nodes in a path may in general be different each time that path is created. When the response comes back to A, the path is set up. Now if A wishes to forward a packet along that path, it places an MPLS header on the front of the packet containing the value assigned by B (4) and sends the packet on a link to B. B, receiving a packet labeled 4, knows it must froward the packet on a link to C with the new label value 20. It replaces the 4 with 20 in the label header and sends the packet to C. Each router in the path replaces the label value with the new one assigned by the next-hop router until the packet arrives at I, bearing the label value 9. Router I knows that it is the end of the path for packets labeled 9, so it strips the label header from the packet and forwards it toward Y using the traditional IP destination address lookup.

In MPLS packet forwarding, each router stores a label map which defines how data with a particular label is to be routed through the network. A label map includes a table which includes an entry for the input circuit identifier, i.e., the identifying label for the router receiving the packet for forwarding, the output link, i.e., the link over which the packet should be forwarded out of the present node, and an output circuit identifier, i.e., the label identifier for the next succeeding node in the path to which the packet is to be forwarded. When a router at a node receives a packet, it examines the label map to determine the link on which the packet is to be forwarded to the next node. It discards the label that was on the packet when it arrived and replaces it with the label for the next node, such that the next node can use its own label map to forward the packet to the next succeeding node.

Figure 3:
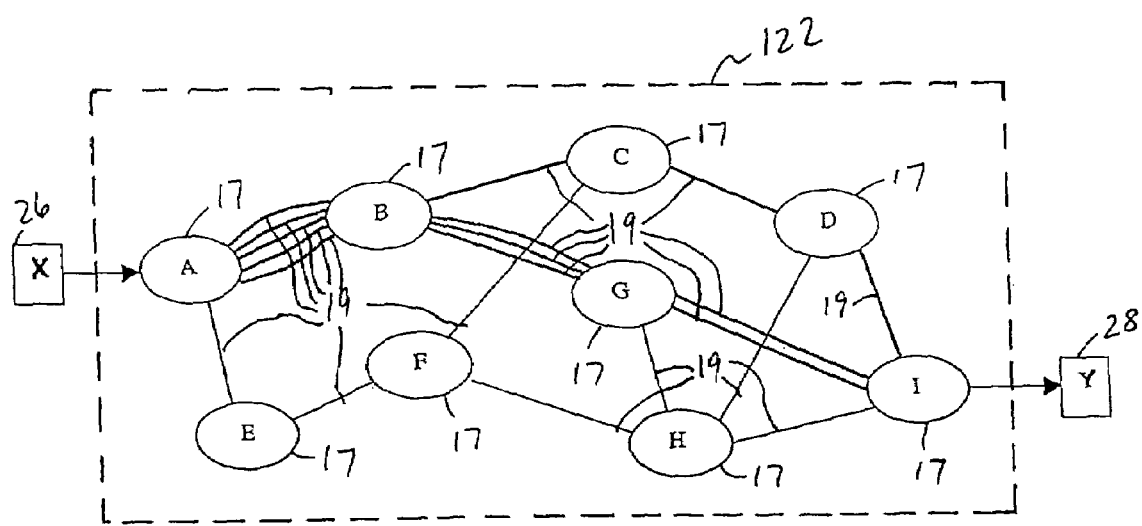
FIG. 3 is a schematic block diagram which illustrates a variation on the subnetwork of FIG. 2 in which pairs of subnetwork nodes can be connected by multiple links.

FIG. 3 is a schematic block diagram which illustrates a variation on the subnetwork 22 of FIG. 2. In the subnetwork 122 of FIG. 3, multiple links 19 can be used between nodes 17 of the subnetwork 122. The multiple links are managed in such a way that the existence of multiple equivalent links between any pair of routers is known only to the link layer. In traditional IP forwarding, they appear as if they were a single link. Under IP forwarding, in the subnetwork 122 of FIG. 3, router A would look up the destination address in a packet for a destination coupled to node Y. The router A decides that the shortest path to Y follows one of the links from A to B. It must select one of five equivalent links for transmission of each packet in such a way as to balance the traffic load over all the available links. There are many ways of making this selection, but it is important to ensure that all packets from X to Y that belong to the same flow take the same link. If they took different links, there is a danger that they would not arrive at Y in the same order that X sent them. Such misordering of packets can cause TCP protocol implementations to react as if packets were lost, resulting in unnecessary retransmission and reduced throughput. Thus router A performs an analysis of the packet header contents to assign each packet to a physical link. Usually this involves a hash function of the 5-tuple of fields in the IP header (source IP address, destination IP address, protocol, source port number, destination port number) or a subset of these fields, such as source IP address and destination IP address. Deriving the link assignment from such a hash ensures that all packets with the same field contents take the same physical link, and thus all packets of a given application flow also take the same kink. This ensures that the existence of multiple links does not contribute to the risk of misordered packets within a flow.

Using traditional MPLS to forward packets through the subnetwork of FIG. 3 presents certain problems. For example, using MPLS to route traffic over the path A-B-G-I in FIG. 3 is considered. The desire is to distribute the traffic evenly across all the links, without producing out-of-order delivery. In this case, it is difficult to compute an IP address hash at each node because the IP header is hidden behind the MPLS header. In accordance with the invention, optimal distribution of the traffic over the multiple links in this path using MPLS is achieved by creating multiple label-switched paths (LSPs) between nodes. In one embodiment, the number of LSPs needed to create the path from the ingress router A to the egress router I is equal to the least common multiple (LCM) of the number of links on each individual hop. For example, for the path A-B-G-I, the number of links on the A-B hop is 5, the number of links on the B-G hop is 3, and the number of links on the G-I hop is 2. Therefore, the number of LSPs generated for the A-B-G-I path should be a minimum of the least common multiple (LCM) of 5, 3 and 2; LCM (5,3,2)=30. The A-B hop would divide the 30 LSPs into five groups of six; the B-G hop would divide the 30 LSPs into three groups of ten; and the G-I hop would divide the LSPs into two groups of fifteen.

Whereas LCM computes the minimal number of paths needed to balance the distribution of paths over a plurality of physical links, this minimal number may be much fewer that the most desirable number. For example, if the number of hops from A to B and B to G in FIG. 3 where changed to 8, LCM (8, 8, 2) gives 8 as the number of paths needed to ensure equal distribution of paths over links on each hop. But if one of the links from B to G were to fail, then LCM (8, 7, 2)=56. In this situation it becomes impossible to balance the load over the remaining links using only eight switched paths. In this example, a number of paths on the order of eight times the LCM may be required to ensure the load can still be a balanced after one or more link failures.

In accordance with the invention, these multiple LSPs are generated simultaneously in response to a single request signal from the ingress router A sent along the path. In accordance with one embodiment of the invention, a mask value is added to the label value when setting up a LSP. By way of example, the MPLS standard uses a 20-bit label. The mask value added according to one embodiment is also a 20-bit number in which a bit is set (1) to indicate that the corresponding label value bit is important in determining the route that packets will take, and clear (0) to indicate that it is not, i.e., that it is a "don't care" bit. The effect is to simultaneously set up a number of LSPs that take the same router-to-router path, but that do not necessarily use the same links between the routers when multipath links are present. The number of LSPs simultaneously created and maintained can be 1, 2, 4, 8, 16, 32, 64, etc., depending on the number of bits that are zero in the mask value. In general, if the number of zero bits is n and the number of paths set up is N, then, in one embodiment, $N=2^n$. These multiple LSPs are referred to herein as an "LSP bundle."

A number of alternative implementations for the mask value of the invention are possible. In one embodiment, the mask value can be transmitted as part of the path setup message. Alternatively, the mask value can be configured in each router in the path. The mask value can be represented as a 20-bit field with ones in the mask position. Alternatively, the mask value can be represented by an integer indicating the number of leading one bits (or trailing zero bits) in the mask. Use of an integer value implies that the mask is a contiguous string of one bits starting in the left-most bit position. It will be understood that other configurations are possible. Also, the bit value interpretations, i.e., one or zero, can be reversed.

The operation of setting up the LSP bundle is analogous to setting up a single path as described above. Assuming by way of example only that a 64-path LSP bundle is to be created for the route A-B-G-I in FIG. 3, in one embodiment, router A sends a path setup request along that path, sending the binary mask value 1111 1111 1111 1100 0000. Each router in the path assigns 64 label values for the 64 bundled LSPs that are being created. The label values are assigned so that they all share the same bit pattern in the bits corresponding to "1" bits in the mask value. One such set of assignments is shown by way of example only in Table 1 below.

TABLE 1

| Router | Label Range Assigned |
| --- | --- |
| B | 0000 0000 0001 0000 0000$_2$–<br>0000 0000 0001 0011 1111$_2$ ($256_{10}$–$319_{10}$) |
| G | 0000 0000 0101 0000 0000$_2$–<br>0000 0000 0101 0011 1111$_2$ ($1280_{10}$–$1343_{10}$) |
| I | 0000 0000 0010 0100 0000$_2$–<br>0000 0000 0010 0111 1111$_2$ ($576_{10}$–$639_{10}$) |

Each router assigns the 64 labels assigned by the downstream router to the links to the next hop so that each link carries approximately the same number of paths. For example, router A could divide router B's 64 labels into four groups of 12 and one group of 16, assigning labels 256 through 267 to one link, 268 through 279 to the next link, 280 through 291 to the next link, 292 through 303 to the next link, and 304 through 319 to the fifth link.

Router A is the entry or ingress to the LSP. It is the last point at which the IP header contents are visible. In one embodiment, router A assigns incoming traffic to one of the LSPs using the IP header. In one embodiment, it computes an IP address hash for each packet and uses the hash value to assign each packet to one of the 64 LSPs. In this particular example, the hash operation returns a 6-bit word used to select one of the 64 LSPs. The hash operation used to compute the hash value can be of the type described in, for example, *The Art of Computer Programming*, Volume 3, "Sorting and Searching," by Donald E. Knuth, published in 1973 by Addison-Wesley, pages 512–513, or other suitable hash operation. The hash operation can include performing a division on the IP source and destination addresses, such as by dividing them by a constant and keeping the remainder as the hash result. Alternatively, the hash can include a cyclic redundancy check (CRC) or a checksum. It will be recognized that other hash procedures can be used in accordance with the invention. The result, given a sufficiently large aggregation of application flows along the route, is a statistically even distribution of traffic across the available links to the egress router I. It should be noted that the hash operation need not be performed on the address fields in the IP header of the packets. Alternatively, the hash can be performed on the protocol field or some other information which identifies the packet as being part of a particular flow between a source node and a destination node.

In accordance with the invention, multiple LSPs can be merged, that is, packets can arrive at a router on different links or with different labels and go out on the same link with the same label. There are three cases considered with respect to merging of LSPs. The first case is the one in which an LSP bundle is joined to a single LSP. In this case, there are two possibilities: either the single LSP can become a bundle, or all the LSPs in the bundle can merge into the single LSP. This choice is a matter of network administration, and it does not increase the possibility that packets will be misordered. The second merging case is the case in which one LSP bundle joins another LSP bundle. In this case, there are three choices for merging: the number of LSPs proceeding forward from the merge point can be the number of LSPs in the original bundle, or it can be the number in the bundle that joined it, or it can be the sum of the two. When mapping one LSP into another, it is only necessary to ensure that packets entering on one LSP do not somehow exit on more than one, since that would cause packet misordering. The third merging case is the case in which a single LSP joins a bundle. In this case, the single LSP must join just one of the LSPs in the bundle.

It is desirable that all routers in the path of the bundled LSP support the mask in the signaling protocol. If they do not, it is still possible to set up bundled LSPs in the routers that support them using a static configuration of the mask length. The mask length should be configured to 20, for example, i.e., exactly one LSP in a bundle, on links toward routers that do not support bundling. If a single LSP is configured to branch into a bundle at some point in the path, it is necessary to look inside the packet, determine if and where an IP header exists within, and hash its contents to assign each packet to one of the bundled LSPs.

It is also possible to signal bundled LSPs along such a heterogeneous path. There are at least two cases considered. The first case is that of a path with a set of links from a router that uses bundled LSPs to one that does not. To illustrate this case, referring to FIG. 3, it is assumed that router A supports bundling and router B does not. When router A receives a bundled LSP setup request for a path leading to B, it can replicate this as it propagates it to B. Each LSP in the bundle generates an individual request to B, so that the number of LSPs in the bundle is maintained.

The second case is that of a path with a set of links from a router that does not use bundled LSPs to one that does. To illustrate this case, referring to FIG. 3, it is assumed that router A supports bundling and router B does not. However, in this case, it is also assumed that router B is setting up a group of paths that lead to router A. When it receives the first request, A can pass it along to the next hop as a bundled request. As it receives subsequent requests from B for LSPs taking the same route, it can map them into the established bundle and send a successful reply to B, without propagating the request further downstream.

An MPLS path or "tunnel" can be configured to be carried inside a second MPLS tunnel by adding a second MPLS header to the front of the packet. Both inner and outer tunnels can be bundled LSPs in accordance with the invention. Individual LSPs of the inner bundle can be mapped to those of the outer bundle. The inner label value implicitly carries the IP address hash information that was calculated at the original ingress. In effect, this same hash can determine LSP assignment into any number of tunnels in a hierarchy.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a data-packet network, a method for routing packets through while ensuring load balancing and in-order delivery for unique packet flow defined by unique source/destination pairs, comprising the steps of:
   (a) providing a label-switching sub-network having one ingress node and one egress node and at least two nodes internal to the sub-network for routing packets;
   (b) creating a sufficient number of label-switched paths (LSPs) from the ingress node to the egress node such that each packet flow has a unique LSP; and
   (c) associating each packet flow with one of the created LSPs;
   wherein each sub-network node is connected by one or more physical parallel links and the number of LSPs created is equal to the least-common multiple of the number of links between each individual internal sub-network node in the node path, wherein the number of links between the sub-network nodes may differentiate and the sufficient number of LSPs are created based on a requirement to balance the distribution of LSPs over the physical links and each LSP created is utilized by the sub-network to balance the load of packet flow through the network.

2. The method of claim 1 wherein, in step (b) a mask value is added to a label value in the process of setting up the LSPs, and the LSPs are all created in response to a single signal sent from the ingress node.

3. A routing system in a data-packet network comprising:
   a label-switching sub-network with one ingress node and one egress node, with at least two nodes internal to the sub-network, each node connected by one or more physical parallel links;
   a mechanism for creating a sufficient number of label-switched paths (LSPs) from the ingress node to the egress node such that each packet flow has a unique LSP; and
   a mechanism for associating each packet flow with one of the created LSPs;
   characterized in that the number of LSPs created is equal to the least-common multiple of the number of links between each individual internal sub-network node in the node path, wherein the number of physical links between the sub-network nodes may differentiate and the sufficient number of LSPs are created based on a requirement to balance the distribution of LSPs over the physical links and each LSP created is utilized by the sub-network to balance the load of packet flow through the network.

* * * * *